3,147,246
OBTENTION OF AN ALKALOID FROM
NUPHAR LUTEUM
Janina Adolfovna Aloshkina, Serafima Alexandrovna Vichkanova, Tamara Nicolaevna Iljinskaia, and Mira Abramovna Roobinchik, all of Moscow, U.S.S.R., assignors to Vsesojuzny Nauchno-Issledovatelsky Institute Lekarstvenny i aromaticheskikh rasteny, Moscow, U.S.S.R.
No Drawing. Filed Feb. 16, 1962, Ser. No. 176,477
2 Claims. (Cl. 260—236)

This invention relates to a protistostatic, protistocidal, and spermatocidal alkaloid preparation and to a method of its production. This invention pertains to the field of pharmaceutics; to be more precise—to the protistostatic, protistocidal and spermatocidal alkaloids possessing bacteriostatic and fungicidal properties as well and a method of their production.

Preparations of this type are prescribed, for instance, for the treatment of diseases such as urogenital trichomoniasis, and as contraceptive agents.

Although a great variety of preparations have been proposed for treating urogenital trichomoniasis and as contraceptives, their number is still insufficient, as, owing to many contraindications, it is not always feasible to select among the many known preparations the one suited to this or that individual case. Hence the problem of treating urogenital trichomoniasis and the creation of contraceptives is still of major importance.

We have found a new preparation that is suitable for the treatment of urogenital trichomoniasis and as a contraceptive, and have invented its production process.

The preparation we claim is an alkaloid hydrochloride with the empiric formula $C_{30}H_{42}O_5N_2$; it is derived from alkaloid-containing plants of the water lily family (the Nymphaeaceae), particularly from the yellow water lily (*Nuphar luteum*).

The first aim of our invention is the creation of a therapeutic alkaloid possessing protistostatic and protistocidal properties.

The second aim of our invention is the creation of a preparation possessing spermatocidal properties.

The third aim of our invention is the creation of a therapeutic preparation of low toxicity that would not irritate the mucous membranes in prolonged administration.

The fourth aim of the present invention is to reveal bacteriostatic and fungicidal properties of the preparation.

A further aim of our invention is the extraction of the preparation from raw plant material.

We propose as a raw material the source of this alkaloid preparation, the rhizomes of a plant of the Nymphaeaceae family, the yellow water lily *Nuphar luteum* α. The alkaloids contained in *Nuphar luteum* are extracted from its dried and crushed rhizomes, in the presence of ammonia, with dichlorethane or some other suitable solvent. From dichlorethane the alkaloids are extracted with 10% sulfuric acid. The acid solutions are alkalized with ammonia and the alkaloids are then extracted with chloroform. The alkaloids are run through salts twice. The chloroform is eliminated by vaporization, and the residual mixture of alkaloids is cautiously desiccated in a vacuum-drier at a temperature not exceeding 60° C., and then finely crushed.

Any other currently existing method may be employed for extracting the mixture of alkaloids from the raw plant material.

For the isolation of the biologically active alkaloid the mixture of alkaloids is dissolved in a 15-fold volume of ethanol and a 20% alcoholic solution of methane-bis-salicylic acid is added until complete precipitation of the salt of the alkaloid being isolated is attained. Upon filtering this solution the methene-bis-salicylate alkaloid precipitate is caught in the filter, all the other alkaloids remaining in the mother liquor. The precipitate is washed through with ethanol and the solvent is thoroughly pressed out. From the filter the precipitate is transferred into a retort, where it is suspended in a 4-fold volume of 10% ammonia; the suspension is poured into a separating funnel, and the entire biologically active alkaloid is extracted with ethyl ether. The ether solution is then dried over roasted potash, filtered and run through an aluminium oxide column (12 to 15 parts of $Al_2O_3$ per 100 ml. of an approximately 3% solution of the base in ether). Dry gaseous hydrogen chloride is run through the eluate until an acid reaction to Congo is observed. The alkaloid hydrochloride falls out; it is caught on a filter, washed with dry ethyl ether and desiccated in a vacuum-dried at 40° C. in a 400 mm. vacuum until the smell of ether disappears. The yield is 55 to 65% of the weight of the initial mixture of alkaloids.

The isolation of the biologically active alkaloid may be attained not only through a methene-bis-salicylate, but also through a perchlorate.

In this case the technique is as follows:
The mixture of alkaloids is dissolved in a 10% solution of hydrochloric acid and the resinous admixtures are filtered away. A 20% aqueous solution of sodium perchlorate is added to the hydrochloric solution until the perchlorate of the sought alkaloid precipitates completely. The precipitate is caught on a filter, while the attending alkaloids remain in the mother liquor; the precipitate is washed with water, and the subsequent process is the same as for the methene-bis-salicylate.

The preparation occurs as a cream-coloured powder, readily soluble in water and ethanol. The toxicity of the preparation is comparatively low, and it has no irritating effect on the mucous membranes in prolonged application.

The protistostatic effect of the preparation on *Trichomonas vaginalis* is manifested in dilutions of 1:25,000–1:1,000,000, and its protistocidal effect in dilutions of 1:200–1:50,000; it destroys spermatozoa instantly in dilutions of 1:1,000–1:10,000.

Further the preparation possesses bacteriostatic properties against gram-positive microorganisms and fungicidal properties as well.

Moreover the preparation possesses optical activity $[\alpha]_D + 104.2°$ (C. 0.96; ethanol) yields crystalline perchlorate with the melting point 225–227° (with decomposition).

The following pharmaceutic forms may be produced with our preparation:

(a) 0.1–0.5% emulsions on a spermaceti base;
(b) A 1% aqueous solution;
(c) Globules based on cacao butter;
(d) Frothing tablets (3 mg. of the preparation to 0.5–1 g. of a frothing mixture).

To illustrate the object of our claim we present the following example of the process of producing the preparation:

*Example.*—2 kg. of dry and finely crushed rhizomes of the yellow water lily (*Nuphar luteum*) are mixed with 1 litre of 10% ammonia, then flooded with 14 litres of dichlorethane and left to stand for 2 hours, after which the dichlorethane extract is decanted. The raw source material is thus processed 5 times. The fifth decantation is poured over a fresh portion of raw material, and dichloroethane is added to make up 14 litres. From each separate decantation of the dichlorethane extract the alkaloids are extracted with 10% sulfuric acid, in portions of 0.5, 0.3 and 0.2 litre. The first two portions (0.5 and 0.3) are united, while the last 0.2 litre of the acid is used for extracting the alkaloids from the next decantation of the dichlorethane extract. The combined sulfuric acid solutions, an amount of 3 to 3.2 litres, are alkalized with 25% ammonia (0.4–0.5 litre), and the alkaloid mixture is then twice extracted with chloroform in portions of 1.5 and 1 litre, and both portions are combined.

0.1 kg. of freshly calcined sodium sulfate is poured into the chloroform solutions of the alkaloids and the vessel containing the solution is vigorously shaken. The liquids are filtered through a paper filter and the chloroform is vaporized over a water bath at a temperature no higher than 40° C., in an approximately 400 mm. vacuum, until a thick resin is obtained. The residue deprived of chloroform is dissolved in 0.2 litre of ethanol, and, stirring constantly, to this solution are added 0.13 to 0.15 litre of a 15% alcoholic solution of methene-bis-salicylic acid. The resulting precipitate is caught on a filter, washed 3 times with ethanol (20 ml. each time), then 3 times with ethyl alcohol (20 ml. each time), removed from the filter and dried in the air within 1 or 2 hours. The methene-bis-salicylate precipitate (the yield is as much as 10.5–11.5 g.) is suspended in 0.05 litre of 10% ammonia, and 0.3 litre of ethyl ether is added to the suspension. The liquid is then shaken vigorously, and the ether extract is isolated and dried with 0.05 kg. of freshly roasted potash. After filtration the ether extract is run through a column of 25 g. of aluminum oxide with a height of no less than 15 to 20 cm. When 0.3 litre of the ether solution has been run through the column the latter is washed out with 0.2 litre of ethyl ether dried over potash. The first portion of the eluate, 0.05 litre, is collected separately (the attending alkaloids), the remaining 0.45 litre together.

Dry hydrogen chloride is passed through a capillary tube, stirring rapidly throughout the process, and into 0.45 litre of the ether solution of the alkaloid until an acid reaction to Congo is obtained. The hydrochloride of the alkaloid ($C_{30}H_{42}O_5N_2 \cdot 2HCl$) is isolated in a glass filter No. 3 and washed three or four times with dry ether (15 ml. each time). The preparation is then desiccated in a vacuum-drier until the odour of the ether disappears. 2 kg. of the raw plant material yield 5.0–5.4 g. of the preparation, or 0.25–0.27% (of air-dried raw material).

What we claim is:
1. A method of obtaining an alkaloid preparation which comprises extracting, in the presence of ammonium hydroxide, a mixture of alkaloids from the rhizomes of *Nuphar luteum* by means of dichloroethane, treating said extraction mixture with 10% sulfuric acid, alkalizing said acidulated mixture with ammonia, extracting said alkaloids from said alkalized mixture by means of chloroform, vaporizing said chloroform from said extraction, desiccating the residual mixture of alkaloids remaining after said vaporization, crushing said residual material, dissolving said crushed residual material in ethanol, adding methene-bis-salicylic acid to precipitate said biologically active alkaloid as its corresponding salt, filtering said alkaloid salt from the supernatant solution, washing said precipitate with ethanol, suspending said washed precipitate in a 10% ammonia solution, extracting said biologically active alkaloid salt from said ammoniated suspension by means of ethyl ether, drying said ethyl ether solution over roasted potash, filtering said ethyl ether solution, passing said dried ether solution through an aluminum oxide column, bubbling dry gaseous hydrogen chloride through the eluate from said aluminum oxide column, collecting the hydrochloride of said biologically active alkaloid salt on a filter, washing said hydrochloride alkaloid salt with ethyl ether and thereafter desiccating said hydrochloride alkaloid salt.

2. A method for obtaining an alkaloid preparation which comprises extracting, in the presence of ammonium hydroxide, a mixture of alkaloids from the rhizomes of *Nuphar luteum* by means of dichloroethane, treating said extraction mixture with 10% sulfuric acid, alkalizing said acidulated mixture with ammonia, extracting said alkaloids from said alkalized mixture by means of chloroform, vaporizing said chloroform from said extraction, desiccating the residual mixture of alkaloids remaining after said vaporization, crushing said residual material, dissolving said crushed residual mixture in a 10% solution of hydrochloric acid, removing by filtration the resinous material formed by said addition of hydrochloric acid solution, adding an aqueous solution of sodium perchlorate to the liquid remaining after said filtration to precipitate said biologically active alkaloid as its corresponding salt, filtering said alkaloid salt from the supernatant solution, washing said precipitate with ethanol, suspending said washed precipitate in a 10% ammonia solution, extracting said biologically active alkaloid salt from said ammoniated suspension by means of ethyl ether, drying said ethyl ether solution over roasted potash, filtering said ethyl ether solution, passing said dried ether solution through an aluminum oxide column, bubbling dry gases hydrogen chloride through the eluate from said aluminum oxide column, collecting the hydrochloride of said biologically active alkaloid salt on a filter, washing said hydrochloride alkaloid salt with ethyl ether and thereafter desiccating said hydrochloride alkaloid salt.

References Cited in the file of this patent

Achmatowicz et al.: Roczniki Chem., vol. 34 (1960), pages 93–102.

Drobot'ko et al.: Chemical Abstracts, vol. 53 (1959), page 12589.